United States Patent
Mustafá

(10) Patent No.: US 9,494,241 B2
(45) Date of Patent: Nov. 15, 2016

(54) SAFETY GAS VALVE CAPABLE TO ATTAIN A BLOCKING CONDITION WHEN SUBJECTED TO A FLOW IN EXCESS OF ITS NOMINAL WORKING CONDITIONS

(71) Applicant: Jorge Ismael Mustafá, Buenos Aires (AR)

(72) Inventor: Jorge Ismael Mustafá, Buenos Aires (AR)

(*) Notice: Subject to any disclaimer, the term of this patent is extended or adjusted under 35 U.S.C. 154(b) by 23 days.

(21) Appl. No.: 14/663,106

(22) Filed: Mar. 19, 2015

(65) Prior Publication Data

US 2015/0267825 A1    Sep. 24, 2015

(30) Foreign Application Priority Data

Mar. 19, 2014 (AR) .............................. 20140101294

(51) Int. Cl.
*F16K 17/34* (2006.01)
*F16K 17/168* (2006.01)
*F16K 17/04* (2006.01)

(52) U.S. Cl.
CPC ........... *F16K 17/168* (2013.01); *F16K 17/042* (2013.01); *Y10T 137/7922* (2015.04)

(58) Field of Classification Search
CPC    F16K 17/042; F16K 17/168; Y10T 37/7922
USPC ................................................. 137/540, 460
See application file for complete search history.

(56) References Cited

U.S. PATENT DOCUMENTS 2,926,690 A * 3/1960  Martin ................... F16K 17/20
                                                                    137/460

* cited by examiner

*Primary Examiner* — Kevin Lee
*Assistant Examiner* — P. Macade Nichols
(74) *Attorney, Agent, or Firm* — Fleit Gibbons Gutman Bongini & Bianco PL; Paul D. Bianco; Lourdes Perez

(57) ABSTRACT

In a body, a first passage (6) houses a first piston (8) which is able to be selectively driven by the excess gas flow towards a blocking position and seal. The valve body has a second through-cut (17) intersecting the seal seat (7) of the first frustoconical piston (8). Within this second cut sits a second piston (21), pressing the end (20) thereof down against the end (9) of the protrusion of the first piston seal seat. This second piston (21) is capable of moving the second piston in interference with the end (9) upstream of the first piston seal eliminating the relationship with said seal seat.

7 Claims, 7 Drawing Sheets

SAFETY GAS VALVE CAPABLE TO ATTAIN A BLOCKING CONDITION WHEN SUBJECTED TO A FLOW IN EXCESS OF ITS NOMINAL WORKING CONDITIONS

FIELD OF THE INVENTION

The present invention is related to a safety valve placed in a fluid circuit between the source of said gas under pressure and the device or appliance to which said gas is being fed, such as, e.g.: a pressure gas regulator, a heater, a stove, etc. That is, the device of this instant invention is applied downstream of the outlet of a gas under pressure and placed in between said source of fluid and any device to which said gas under pressure is being supplied to.

To be able to properly understand the corresponding amplitude and scope of this instant invention the following terms are given the following comprehensive definitions:

GAS: This is the name given to all gasified fluids, either in their liquid state under pressure or in their gaseous state, also under pressure, such as GNC, LPG, domestic gas mains supplied by gas utilities, and industrial gasses such as oxygen, nitrogen, hydrogen, Freon, acetylene, argon, etc.

FLUID SOURCE: This is the name given to any source from which said gas is being supplied or fed into the circuit. This source can be a pressurized gas bottle, container, storage tank or a generic pipe supplying fluid from a utility.

GAS FLOW REGULATOR: By this it is meant named and understood the known pressure regulator devices capable to provide, when connected to a fluid source, a steady flow of gas at a regulated given nominal working pressure.

BACKGROUND OF THE INVENTION

It is known to place a gas pressure flow regulator between the source of gas under pressure and the industrial or home device or appliance to which said gas is fed, such as a burner, torch, stove, heater, etc. This includes the tubes or cylinders containing industrial gasses under pressure. These known gas pressure regulators, or flow regulators, are generally a flattened disk shape body with an entrance and an outlet, within which it is housed a diaphragm calibrated to allow the passage of a flow of gas to said appliance to which said gas is being fed, at a steady pressure, with a constant and controlled rate.

One of the many problems encountered in the course of the use of said regulators counter or prevent the issue of an excess flow of gas, usually at a higher pressure, provoked, among other reasons, either by damage or severance of the tube or conduit connecting the source of gas to the appliance, or by failure of this same device or appliance, including the eventual shattering or damage to said gas regulator's feeds. In all said cases, the gas will be released at a larger volume and/or pressure, flooding the space (e.g., a room where said appliance is installed) and my cause fires, explosions, etc. with damage to property and persons.

Another drawback of these known regulators is given at the moment a device or appliance is being connected to the source of gas or supply line. At present, in order to be able to perform safely said connection it is necessary to close the stopcock feeding said gas from said source, thus preventing a sudden release of gas under pressure, and if by any reason said check valve is placed at a far distance, from said connection, to close timely said valve may constitute an inconvenience. The same can be argued when the supply line is already connected to a gas flow regulator, because if said connection is being performed with said stopcock in an "open" position, the user may face risks.

To date there are no known in the art safety devices placed between the under pressure gas source and the appliance supplied with said gas which allows for an automatic blocking or closure of said gas source when faced with a sudden excess of the nominal gas flow rate; further, it is also unknown to have a device that, upon said blocking, may at the same time provide the means to reset the nominal fluid gas flow conditions without having the dissemble part of the valve, or to close the taps and/or closing the line of conduit of gas delivery, being this resetting performed within the same security valve by means of a simple resetting operation performed without the need of any special tool, in a simple and one step operation,

OBJECT OF THE INVENTION

The main object of this instant invention is to provide a safety valve which, when placed between a gas source and the device to which said gas is being fed, such as a gas flow regulator, it allows to block the exit of said gas from said source when faced with a flow of gas in excess of the nominal values allowed by the device making use of said fluid, being this excess flow provoked by either damage to the device, or by rupture or severance of the feeding conduits, or including, by malfunctioning of said gas flow regulator, while, at the same, within this same safety device construction it is provided the means to reset the free passage of gas, thus restoring the working conditions after having suffered said blocking conditions, by performing a simple and single operation clearing the blocking situation acting directly over said blocking means with the safety valve of the invention, without the need of any tools, and without the need to disassemble any part thereof, and most important, without the need to interrupt the fluid supply.

It is a further object of the invention, to achieve a safety valve capable to block the passage of a gas at any time and under any performing conditions when due to a puncture, severance of damage it occurs an abnormal flow of gas, and after, to selectively allowing to reset the working conditions operating over said same safety valve.

A further object of this instant invention is that in one of its embodiments this safety valve is calibrated to operate with a gas source at a relatively low pressure, for example 2 to 10 atmospheres, while in another of its constructions, this same device can perform under higher pressure, such as 200 to 300 atmospheres, allowing to reset the working conditions even under such high pressures.

Last, it is further object of this invention this safety valve may be applied to any sources of a gas fluid, including natural gas, GNC, GLP, industrial gasses, and even explosive gasses.

BRIEF SUMMARY OF THE INVENTION

SAFETY GAS VALVE CAPABLE TO ATTAIN A BLOCKING CONDITION WHEN SUBJECTED TO A FLOW IN EXCESS OF ITS NOMINAL WORKING CONDITIONS, INTERPOSED BETWEEN A SOURCE OF GAS UNDER PRESSURE AND THE DEVICE OR EQUIPMENT TO WHICH SAID SOURCE OF GAS IS BEING SUPPLIED, wherein a valve body has a first and a second end, having said valve body a first bore defining a first passage open at both ends thereof; this first end of the valve body with said first bore communicates with the gas source, whilst its opposite end connects with a coupling means or device linkable to the actual device to which the gas is being fed; within said first bore it is provided a seat, against which seats in a selectively sealing relationship one end of a first piston placed within said first bore, while the opposite end of this first piston is facing the gas stream coming from said gas source; between this sealing seat and the first mentioned piston it is placed a compression spring biasing the first piston towards said first end of the valve body, reacting this spring against a recess provided in said first piston; said first piston travels axially within said first passage from a position allowing the free passage of gas, to a blocking and sealing position in which it closes said first passage preventing the outlet of said fluid, wherein said valve includes a second bore performed in said valve body, substantially perpendicular to the axis of the first bore defining said second bore a passage intersecting and communicating with said first passage or bore immediately after the sealing seat of the first piston; within said second bore or second passage it is housed a second piston or plunger sliding axially within said second passage and biased by an elastic means, with its longitudinal axis intercepting the longitudinal axis of the first piston; this second piston has means accessible from outside said valve body capable to selectively displace said second piston or plunger at a meeting point of its longitudinal axis in interception with the axis of the first piston when said first piston is found in its sealing position in a sealing and blocking relationship, causing the axial displacement of the first piston away from the sealing connection, resetting the free gas passage, while the first piston is having an end thereof along its longitudinal axis in interception of said second piston, displacing said plunger upwards when said first piston is displaced in its sealing position, causing the blocking of the main passage and the corresponding axial displacement upwards of the second piston.

DETAILED DESCRIPTION OF THE INVENTION

In order to achieve examples of the preferred embodiments of the present invention, the following drawings which illustrate it are given, in support of the description thereof given hereinafter; these constructions are understood as one of the many possible constructions of this instant invention, therefore it corresponds to give to the embodiments no limiting value of the invention, being included in these constructions and within the scope of protection of this invention all the equivalent means achieving the same results, while the amplitude and scope of the present invention is determined by the first claim herewith attached.

In all the following figures, the same reference numbers are identifying equal means or their equivalents.

FIG. 1 shows a cross section of the device of this instant invention, wherein the a first piston is placed in its release position of the passage, e.g., without its end assuming a blocking or sealing position, while the resetting plunger or second piston is placed at its interference position, intercepting the axis of said first piston, but at a distance from its end, without blocking the gas outlet.

Figure 1:
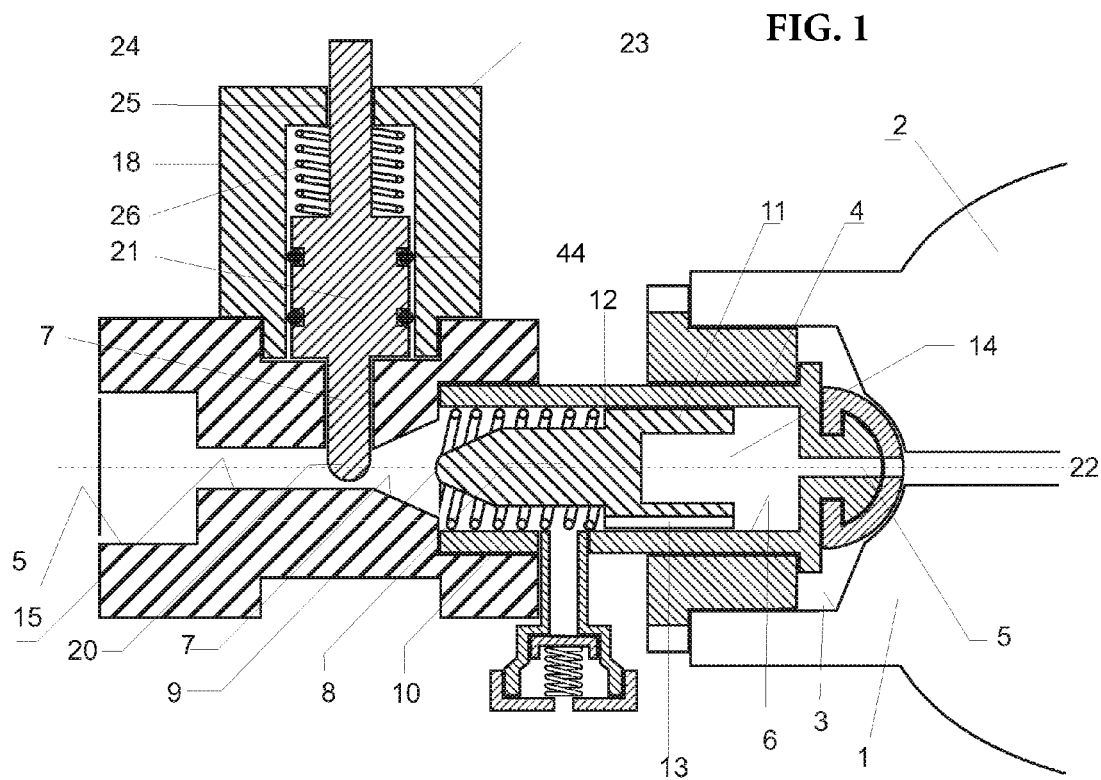

In the given figures, reference (1) indicates the coupling end of the valve body, downstream of the pressure regulator (2). This coupling end (1) has a coupling means such as a female screw thread (3), within which is inserted and coupled in sealing relationship the first end (4) of a valve body.

This valve body has a first bore or first passage defining a first opening thereof at both ends and which passage at its first end (4) of the valve body has a first end or first section of passage (5) communicating with the said gas regulator (2). Downstream this first section of passage (5) undergoes an increase in its diameter, determining inner walls with a second end in which a seal seat (7) is obtained.

Inside of the cylindrical portion (6) of said first passage lodges a piston (8) axially displaceable along said passage (6) between a sealing position and a second position releasing the fluid communication. FIG. 1 shows the piston in its release position of the passage, e.g., without its end assuming a blocking or sealing position. In the blocking or sealing position, said piston has its downstream end (9) establishing a closing seal against said seat (7). For practical purposes, said seat (7) has a conical shape, while the end (9) of the piston (8) which seats against it has a complementary shape, which ends in the preferred embodiment in a blunt or rounded tip (9), although nothing prevents this end to be shaped as a sharp cone.

Upstream of the end of seat (7), is provided an annular ledge (12) of larger diameter against which rests a compression spring (10) which in turn surrounds the front portion of the first piston (8) and reacts against an increase in diameter of said piston (11), while the end (14) of piston (8) opposite the front end (9) is facing the gas flow (22) coming from the source gas from (2) and is biased to the sealing position against the resistance of the spring (10). When the force exerted over said piston by the gas exceeds a certain predetermined value depending on the excess flow, it causes the displacement of the piston to its sealing position overcoming said resilient means (10) pressing (9) onto the seat (7). The gas (22) (see the arrow in FIG. 1) moves downstream in the direction of the arrow and is led to a through-recess (13) formed in the lateral portion (13) of the first piston passage, but its flow is stopped at said seat when the piston is closing the communication.

After said sealing seat (7), the first passage is continued downstream by a section (15) which leads to the coupling (16) to which the gas feed is connected to the device or appliance to be fed with said fluid feed (the device or appliance is not shown).

The valve body has a second bore defining a second passage (17) which intersects the first passage at (15), placed immediately after the end of the sealing seat (7). Said first valve body is attached or is continued by a second body (18)

which defines internally a cylinder (19) (see FIG. 2) within which is placed a second piston axially travelling within said cylinder (19). The second piston has one end (20) which is received axially displaceable within the second passage or second bore (17) and is secured to a diametrical expansion (21) defining the piston itself. The end of the needle-shaped with blunt tip extension (20) gives origin to this diametrical expansion (21) defining a lower limit to the axial travel for the second piston (21).

Preferably, this second bore or second passage (17) is perpendicular to the first bore or first passage at its portion (15), although nothing prevents the second bore to be placed oblique to the drill of the first bore. The condition to be fulfilled to the purposes of this instant invention that the second bore must intersect the first bore downstream of the seal seat (7), and still more preferably, without this limiting the scope of the present invention, the second bore is practiced immediately adjacent and downstream of this seal seat (7).

The second body of this valve has at its upper end a cap or lid (23) through which it is possible to operate on the second piston to apply a downward interference concurrently with the end (9) of the first piston.

In the embodiment Illustrated in FIG. 1 to FIG. 4, piston (21) has an extension (24) protruding out of the cap through a passage (25) formed therein, allowing to operate over said second piston which can thus be made to travel axially making the needle (20) attached to the same to be pressed against said projecting portion (24). The said piston is sealed by a plurality of "O-rings" (44), and is biased by interference with the first piston by a compression spring means (26).

Figure 2:
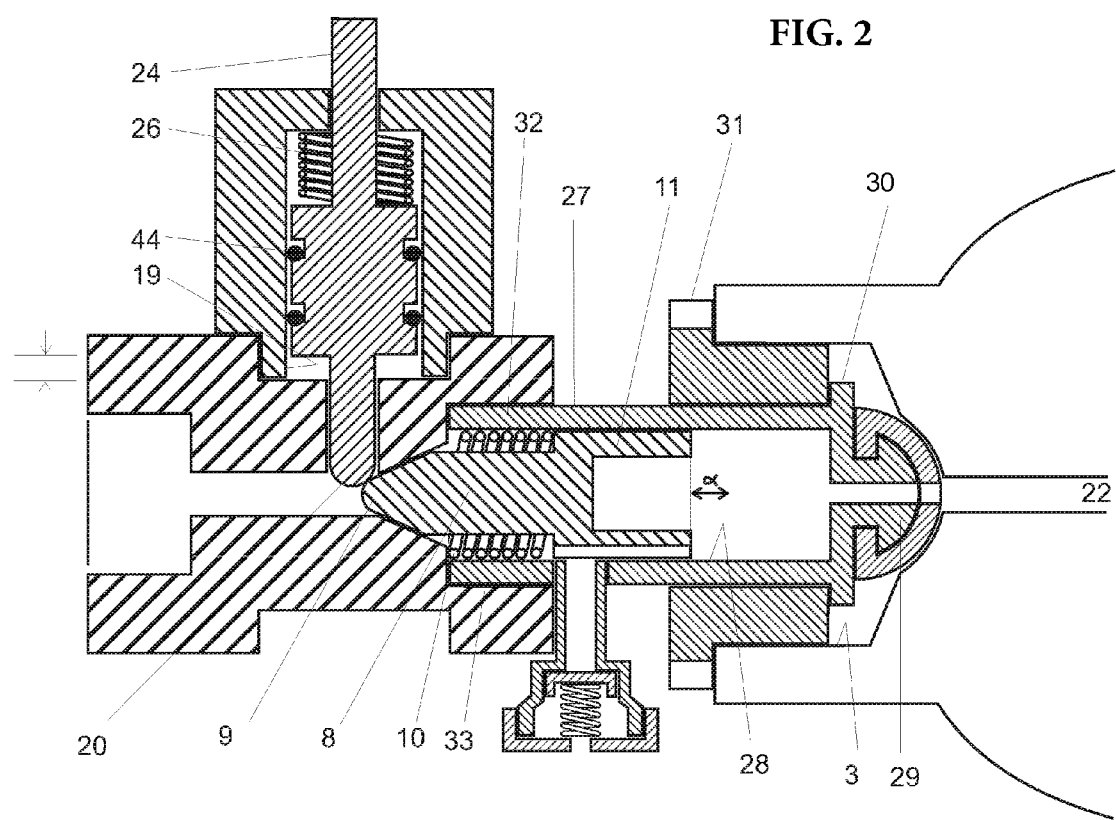
FIG. 2 shows the same construction of FIG. 1, but in this instant FIG. 2 the first piston attains a blocking position of the gas outlet, while its piston end interferes with the interference axis of the second piston, thus forcing this second piston upwards.

FIG. 2 shows the same construction as in FIG. 1, and in this FIG. 2 the first piston is in sealing position, namely, its end (9) of piston (8) moves against the seat (7) to a sealing position, overcoming the resistance of spring (10) which is loaded, thus closing said first piston the fluid passage. In this case it is observed how the extremity (9), interfering with the end (20) of the needle of the second piston (21) forces same to be displaced same upward, overcoming the resistance of spring (26) which is compression loaded.

Also, FIG. 2 shows a detailed preferred construction of the first body, without meaning any limitation thereof to the scope of the present invention. In this FIG. 2, in a manner known in the art, it is indicated with reference (27) cylindrical walls (28) having an attachment end (29) to the coupling (1) of the pressure regulator (2) and this end (29) having the passage (5). This attachment end (29) has a backrest (30). On the outer surface (28) is provided a sleeve (31) with an external screw thread which engages in a threaded socket (3) in (1), establishing a solicitation of (29) against the outlet valve (22) defining an airtight and watertight joint. The other end (32) of (27) opposed to (29), has an external screw thread which engages in a complementary screw thread formed in a cylindrical recess (33) formed in the first body.

Figure 5:
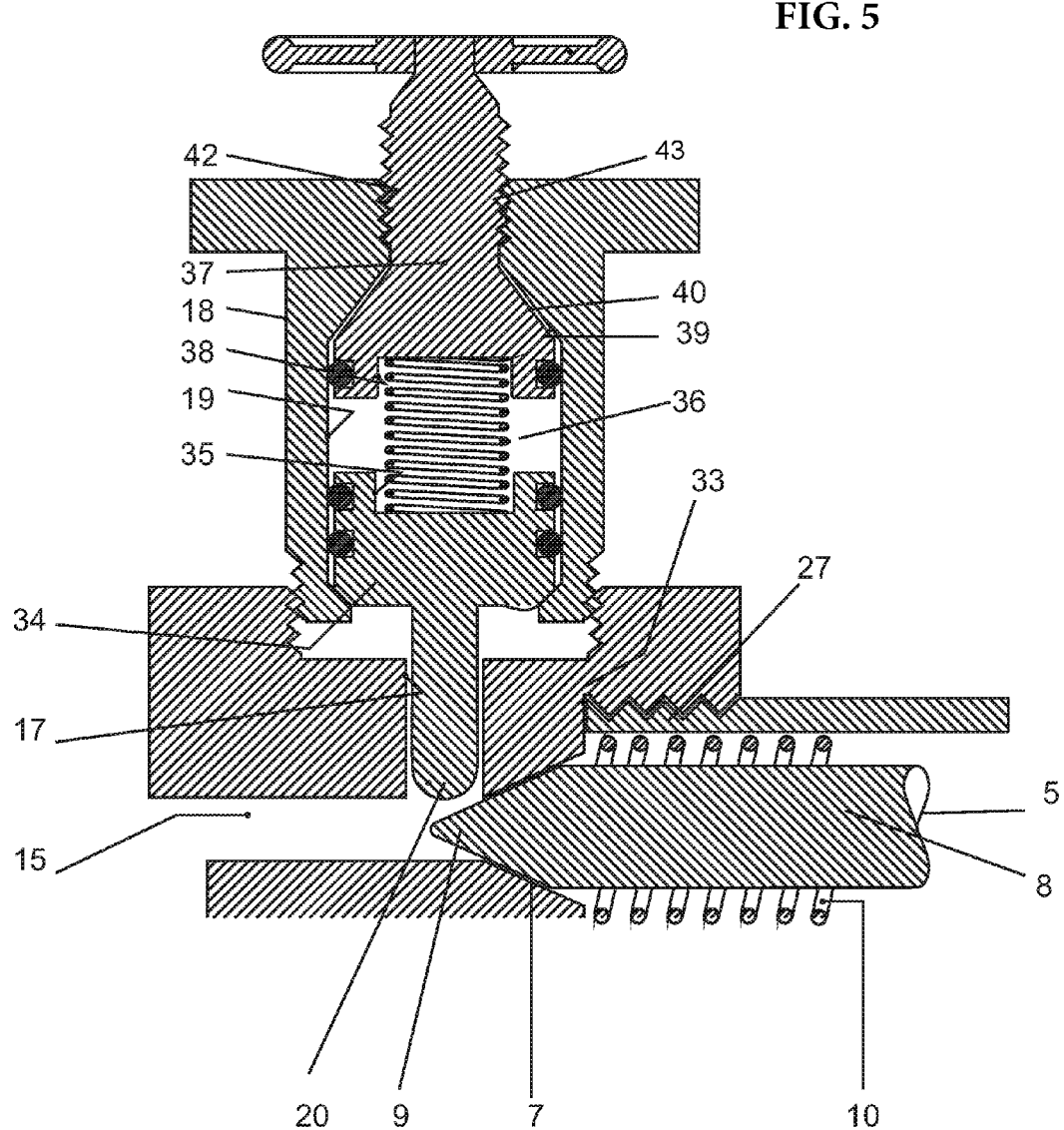
FIG. 5 shows an alternative construction for the resetting plunger of second piston in the interference position of the first piston.
Figure 6:
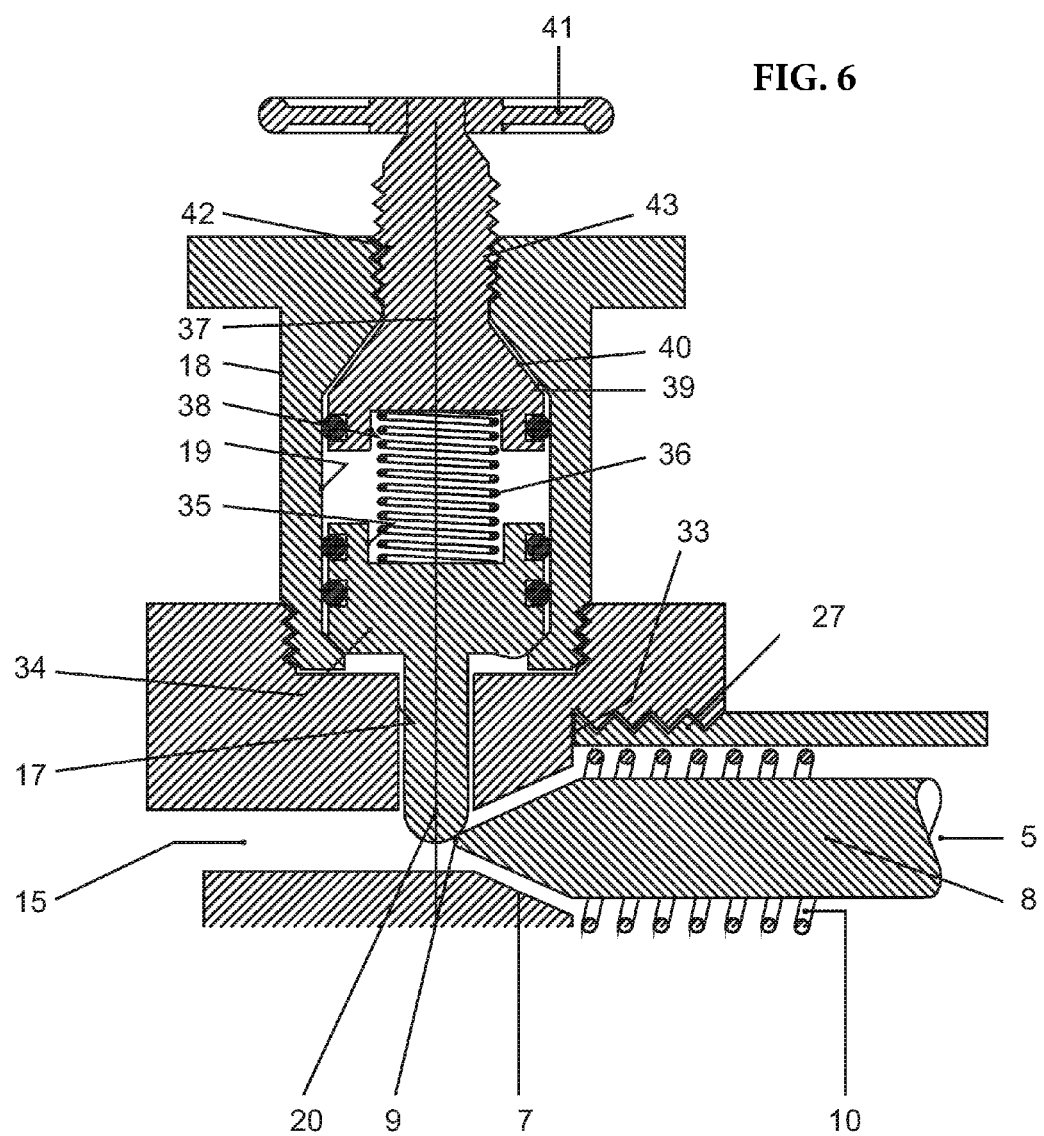
FIG. 6 shows the same construction of FIG. 5, with the plunger of resetting second piston in its resetting position, beginning to open the passage for the gas outlet by pushing backwards the first piston.

Another construction of the present invention, in which the second piston is provided severed into two parts axially aligned thereof, is illustrated in FIGS. 5 and 6. A first portion (34) has a needle extension (20) thereof, and at its opposite portion it has a recess (35) into which rests a compression spring (36). A second portion (37) of said second piston is axially aligned to (34), opposed to and facing the recess (35), having another recess (38) within which rests and reacts the mentioned resilient means (36). This assembly is housed inside a second body (18) which defines internally a cylinder (19). To ensure the sealing and prevent leakage of fluid, the second body has a conical surface (39) against which rests a complementary conical surface belonging to the second portion (37) establishing a watertight metal to metal seal complementary conical surface (40). This second portion (37) is axially displaceable by turning the wheel (41) (or equivalent means) which rotates on a helical thread fillet (42), coupled to a complementary helical thread fillet (43) formed in the second body (18).

OPERATION OF THE INVENTION

In FIG. 1 we see the device of the invention in the position in which the piston is displaced upstream of the gas flow originating from the gas source, which allows the passage of fluid from (22), (13), through the seal seat (7) and the passage (15) feeding the fluid to device or appliance. This position corresponds to the following two conditions:

a) When the appliance or device is coupled to the fluid source, and said source of fluid but has not yet been enabled (e.g., with its own valve closed). In this case the force exerted by spring (10) moves backwards the piston (8) (e.g., upstream of the fluid flow) which finds no solicitation of pressure caused by said fluid source.

b) The other possibility for the above situation is given when, having enabled the exit of the fluid stream (22), the gas fills the entire enclosure (6) and when the gas pressures are equalizes, the piston (8) is moved back by the spring (10).

In FIG. 2, it is observed what happens when the following two situations takes place:

c) when the valve is in the state shown in the figure, that is, with the fluid passage enabled, there is a sudden increase in flow, or an excess flow, whereupon the gas flow (22) pushes the piston (11) against the resistance of spring (10), and the closing end (9) of the piston (8) sits in metal-metal airtight seal relation against the sealing seat (7), closing the passage of gas. Having displaced downstream the end (9) in a travel distance (0 from the initial position upstream, the interference with the end (20) takes place, forcing the second piston (21) to be displaced a travel distance (e), and in the case of the construction of FIG. 1, overcoming the spring (26).

d) The other possible situation occurs when a gas source (22) is enabled for the first time and the passage is opened, the pressure pushes the piston to the first locking (sealing) position, automatically producing a security situation (blocking). The user can restore immediate and easily free passage of fluid, by pressing on the protruding end (24) of the second piston, forcing the end (20) of the needle of same in interference with the axis of the first piston, which is thus pushes the end (9) to its upstream position, breaking the seal and enabling the passage of gas.

Figure 3:
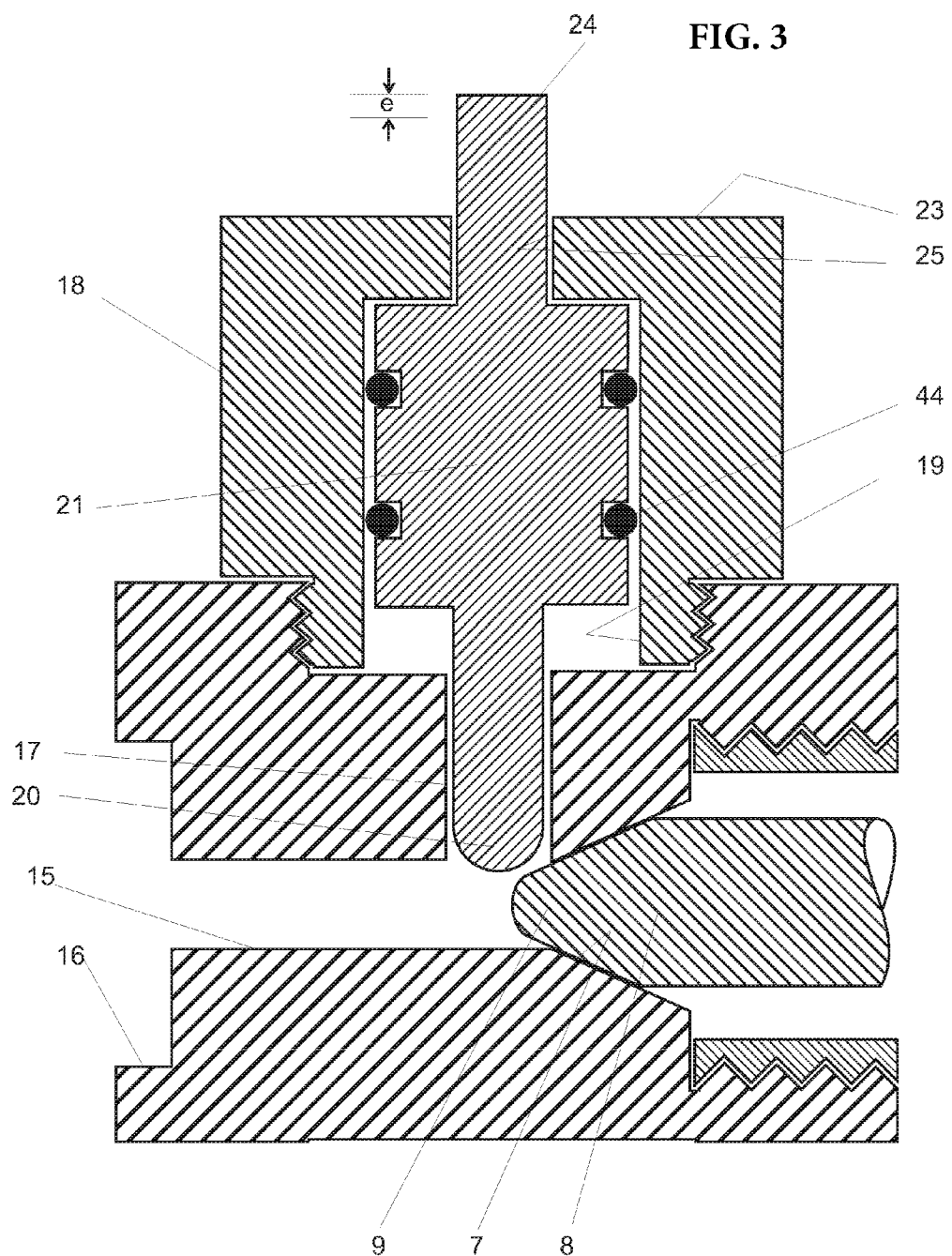
FIG. 3 is a detailed enlargement of part of FIG. 2, wherein the interference attained by both ends of both first and second piston is depicted.
Figure 4:
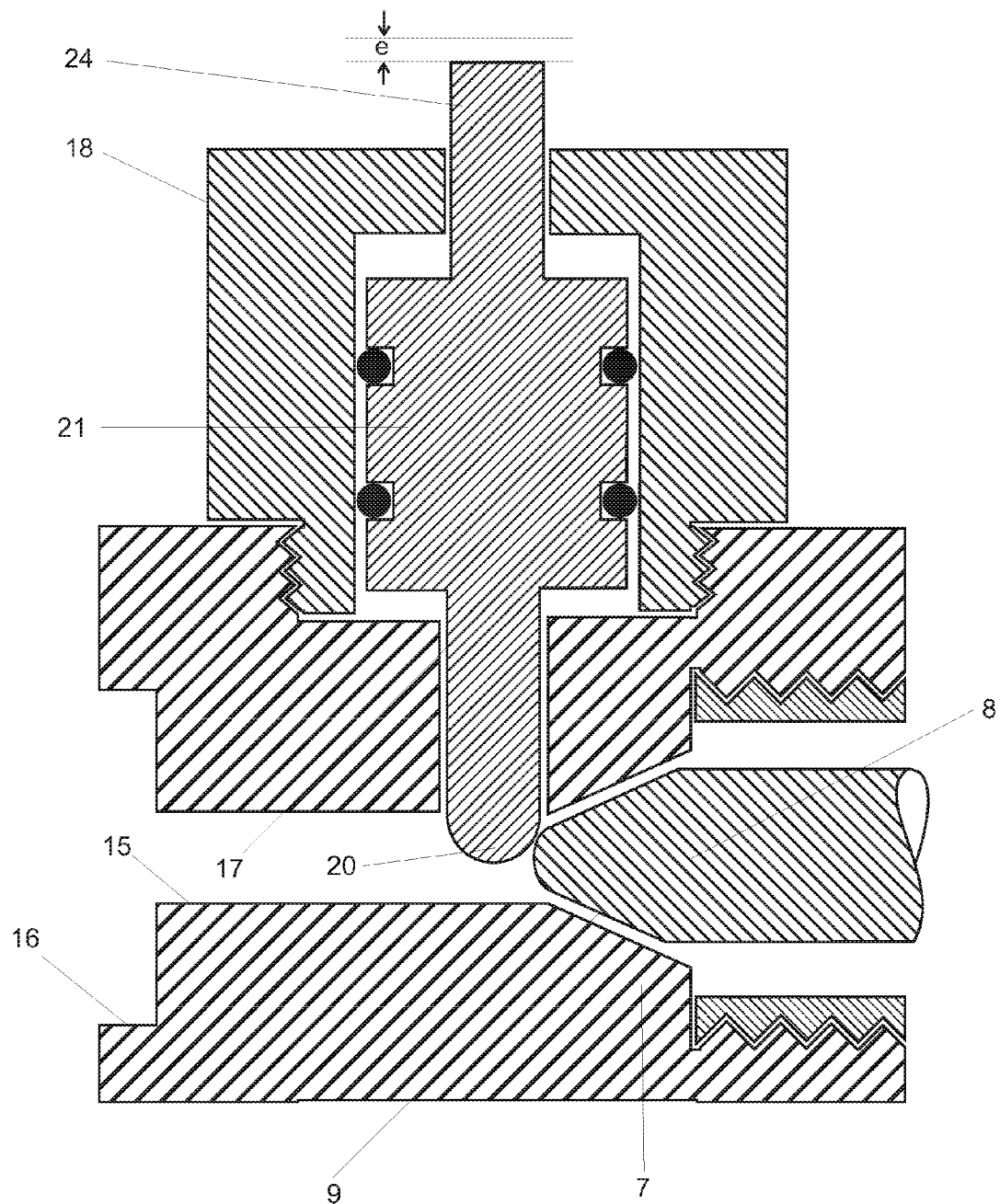
FIG. 4 shows how, by pressing downwards the plunger of second piston, the working conditions, liberating the free passage of the gas, is attained.

In FIGS. 3 and 4, the operation of the present invention is detailed. FIG. 3 shows the end (9) of the first piston (8) seated against the seat (7) closing or blocking the passage of the fluid with an airtight seal in relation to the axis of the first piston (8) pushing up the second piston (21) in an displacement (e).

FIG. 4 shows resetting the valve to its position of "open valve", which is achieved by pressing the projecting end (24) and sliding down the same axial displacement (e), by which we get the end (20) to be pushed rearward (i.e. upstream) the end (9) of the first piston (8). The second piston this is placed in its lower position on a permanent basis, until any cause, such as an excess pushed back the piston (8) upwards.

It is noted that in the construction of FIGS. 3 and 4, the second piston does not have any elastic biasing means.

Figure 7:
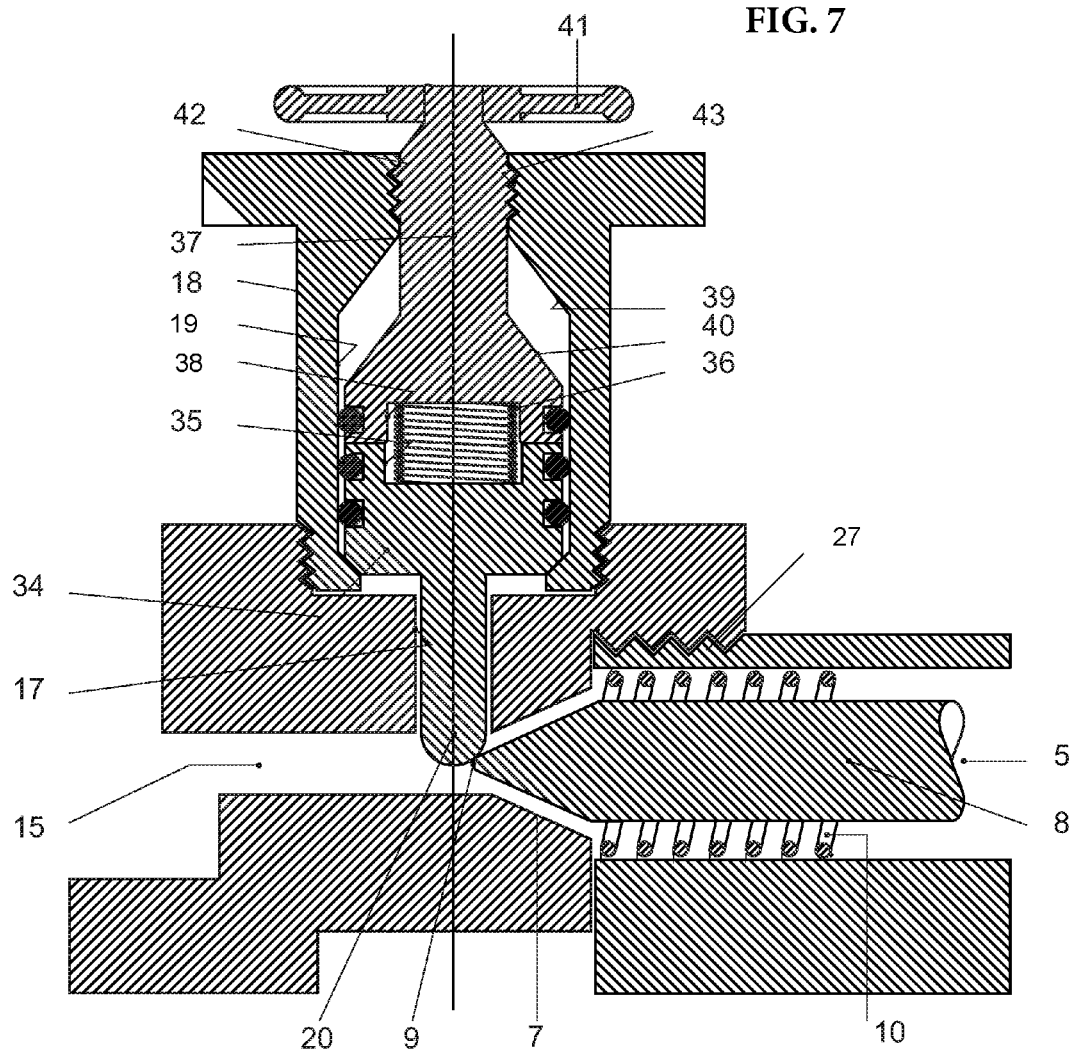
FIG. 7 shows this same construction with the free passage of gas fully resettled.

FIGS. 5-7 show the other aforementioned construction, with the second piston split into two parts (37), (34) axially aligned and with the interposition of a compression spring (36). FIG. 5 illustrates the valve in its blocking position, (e.g. with the end (9) of the first piston seated against the seat (7) producing an airtight sealing condition in the valve body. In this case, the interference with the end (20) of the second piston moves axially upwards the needle (20) in a path (e), partially compressing the spring (36). It is noted that in this figure the second upper part (37) of the second piston is settled with its conical portion (39) against a complementary seat (40) establishing an additional metal-metal airtight seal, ensuring the airtight condition avoiding the loss of fluid.

FIG. 6 shows the same construction but in extreme conditions (7) allows the passage of fluid, and the needle (20) of the second piston is moved downwards, FIG. 7 illustrates how in practice this resetting conditions of the passage of fluid is achieved. This is accomplished by turning the steering wheel (or equivalent (41), which performs the downward displacement of the portion (37) of a piston pressing on the spring (36), which the pushes down the needle (20) so that its interference with (9) moves (9) backwards, i.e. upstream. This construction is particularly suitable to reset the valve when it is used in conjunction with a source of gas (22) at very high pressure.

The invention claimed is:

1. A safety gas valve capable to attain a blocking condition when subjected to a flow in excess of nominal working conditions of the safety gas valve, interposed between a source of gas under pressure and a device or equipment to which said source of gas is being supplied, wherein a valve body has a first and a second end, having said valve body with a first bore defining a first passage open at both ends thereof; the first end of the valve body with said first bore communicates with the gas source, whilst the second end connects with a coupling means or device linkable to the device or equipment to which a gas is being fed; within said first bore said valve body is provided a seat, against which seats in a selectively sealing relationship one end of a first piston placed within said first bore, while an opposite end of the first piston is facing a gas stream coming from said gas source; a compression spring between said seat and said first piston biases the first piston towards said first end of the valve body, pressing said spring against a recess provided in said first piston; said first piston travels axially within said first passage from a position allowing a free passage of gas, to a blocking and sealing position in which said first piston closes said first passage preventing outlet of said gas, wherein said valve includes a second bore located in said valve body, substantially perpendicular to an axis of the first bore defining said second bore is a passage intersecting and communicating with said first passage or first bore immediately after a sealing seat of the first piston; within said second bore or second passage is housed a second piston or plunger sliding and axially within said second passage and biased by an elastic means, with a longitudinal axis of said second bore intercepting a longitudinal axis of the first piston; said second piston has means accessible from outside said valve body capable to selectively displace said second piston or plunger at a meeting point of said longitudinal axis of said second bore, intercepting the axis of the first piston when said first piston is found in the sealing position in a sealing and blocking relationship, causing an axial displacement of the first piston away from a sealing connection, resetting free passage of the gas, while the first piston is having the one end thereof along the longitudinal axis of the first piston intercepting said second piston, displacing said plunger upwards when said first piston is displaced in the sealing position, causing blocking of a main passage and a corresponding axial displacement upwards of the second piston.

2. The safety gas valve, according to claim 1, wherein the sealing seat is a frustoconical seat portion, with the one end of the first piston sitting against said seat, determining a metal to metal sealing relationship, having a profile complementary to said seat; an interference between the end of the one first piston and an end of said second piston determined by a portion of the one end of the first piston and the end of the second piston in contact with each other defined by an intersection of the longitudinal axis of the first piston with a longitudinal axis of the second piston.

3. The safety gas valve, according to claim 1, wherein a longitudinal axis of the first bore is perpendicular to the longitudinal axis of said second bore.

4. The safety gas valve, according to claim 1, moving the second piston toward the one end of the first piston by a portion of an opposite end of the second piston which protrudes outside the valve body, and said portion is selectively displaceable by a user.

5. The safety gas valve, according to claim 1, wherein a means for moving the second piston toward the one end of the first piston includes an upper end of the second piston interposed between the second piston and the compression spring.

6. The safety gas valve, according to claim 1, wherein the second piston has a body divided into two axially aligned portions; a lower portion of said second piston has a needle tip end in contact with the first piston, while an opposite end defines a seat for a compression spring means interposed between the two portions of the second piston; a second portion of said second piston includes a conical track selectively sitting against a complementary second body, establishing a relationship of metal-metal seal being provided to said second portion below a thread that sits against a complementary thread of the second body, with a portion thereof protruding outside a second body, and provided with means for allowing a rotation and axial displacement thereof, pressing on the resilient means and moving the lower portion of the second piston in interference with the axis the first piston.

7. The safety gas valve, according to claim 1, wherein the safety gas valve is placed between the gas source and the device or equipment, said device being chosen from a heater, a gas diffuser, a gas regulator, a gas engine and a gas burner.

* * * * *